United States Patent
Jeung et al.

(10) Patent No.: US 11,843,089 B2
(45) Date of Patent: Dec. 12, 2023

(54) ROBOT COMPRISING ROBOT ARM

(71) Applicant: LG CHEM, LTD., Seoul (KR)

(72) Inventors: Seok-Won Jeung, Daejeon (KR); Geon-Tae Park, Daejeon (KR); Ju-Hwan Baek, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 446 days.

(21) Appl. No.: 16/973,372

(22) PCT Filed: Oct. 1, 2019

(86) PCT No.: PCT/KR2019/012865
§ 371 (c)(1),
(2) Date: Dec. 8, 2020

(87) PCT Pub. No.: WO2020/091240
PCT Pub. Date: May 7, 2020

(65) Prior Publication Data
US 2021/0257648 A1    Aug. 19, 2021

(30) Foreign Application Priority Data
Nov. 2, 2018    (KR) .......................... 10-2018-0133815

(51) Int. Cl.
*H01M 10/04*     (2006.01)
*H01M 50/213*    (2021.01)
*B25J 15/00*     (2006.01)

(52) U.S. Cl.
CPC ..... *H01M 10/0404* (2013.01); *B25J 15/0052* (2013.01); *H01M 50/213* (2021.01)

(58) Field of Classification Search
None
See application file for complete search history.

(56) References Cited

U.S. PATENT DOCUMENTS

2007/0266553 A1    11/2007  Schlogl
2010/0047676 A1*   2/2010   Park .................... H01M 50/271
                                                          429/93

(Continued)

FOREIGN PATENT DOCUMENTS

CN    102456908 A    5/2012
CN    102738499 A    10/2012

(Continued)

OTHER PUBLICATIONS

Extended European Search Report for corresponding European Application No. 19879194.9, dated Oct. 6, 2021.

(Continued)

*Primary Examiner* — Gregg Cantelmo
(74) *Attorney, Agent, or Firm* — Birch, Stewart, Kolasch & Birch, LLP

(57) ABSTRACT

Discussed is a manufacturing apparatus including a robot arm, which may increase production efficiency and greatly reduce the size of manufacturing equipment. The manufacturing apparatus includes a robot arm to manufacture a battery module that includes a plurality of cylindrical battery cells and a module housing having an upper case and a lower case configured to accommodate the plurality of cylindrical battery cells. The robot arm includes a first gripper configured to hold or release the plurality of cylindrical battery cells; a second gripper configured to hold or release the upper case; and a third gripper configured to hold or release the lower case.

14 Claims, 8 Drawing Sheets

(56) References Cited

U.S. PATENT DOCUMENTS

| | | |
|---|---|---|
| 2011/0133501 A1 | 6/2011 | Yeum et al. |
| 2012/0039699 A1 | 2/2012 | Ward et al. |
| 2012/0056440 A1 | 3/2012 | Yeum |
| 2012/0100399 A1 | 4/2012 | Adachi et al. |
| 2012/0133371 A1 | 5/2012 | Toomre et al. |
| 2012/0231309 A1 | 9/2012 | Itoi et al. |
| 2013/0310980 A1* | 11/2013 | Matsuoka ............ B25J 15/0023 700/260 |
| 2014/0360993 A1 | 12/2014 | Yeum |
| 2015/0249258 A1 | 9/2015 | Wolf et al. |
| 2018/0102519 A1 | 4/2018 | Tschiggfrei et al. |

FOREIGN PATENT DOCUMENTS

| | | | |
|---|---|---|---|
| CN | 105800314 A | * 7/2016 | ............. B07C 5/344 |
| CN | 207818793 U | 9/2018 | |
| JP | 2001-252887 A | 9/2001 | |
| JP | 2008-194770 A | 8/2008 | |
| JP | 4923314 B1 | 4/2012 | |
| KR | 10-2007-0088672 A | 8/2007 | |
| KR | 10-0787186 B1 | 12/2007 | |
| KR | 10-2011-0016192 A | 2/2011 | |
| KR | 10-1405055 B1 | 6/2014 | |
| KR | 10-2015-0089036 A | 8/2015 | |
| KR | 10-2016-0050899 A | 5/2016 | |
| KR | 20-2016-0002834 U | 8/2016 | |
| KR | 10-1753336 B1 | 7/2017 | |
| WO | WO 2008/067846 A1 | 6/2008 | |
| WO | WO 2017/178924 A1 | 10/2017 | |

OTHER PUBLICATIONS

International Search Report for PCT/KR2019/012865 (PCT/ISA/210) dated Jan. 29, 2020.

* cited by examiner

ROBOT COMPRISING ROBOT ARM

TECHNICAL FIELD

The present disclosure relates to a robot including a robot arm, and more particularly, to a manufacturing apparatus including a robot arm, which enhances production efficiency and allows automated production.

The present application claims priority to Korean Patent Application No. 10-2018-0133815 filed on Nov. 2, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among them, the lithium secondary battery has been spotlighted since it has almost no memory effect compared to nickel-based secondary batteries to ensure free charge and discharge and also has very low discharge rate and high energy density.

The lithium secondary battery mainly uses a lithium-based oxide and a carbon material as a positive electrode active material and a negative electrode active material, respectively. The lithium secondary battery includes an electrode assembly, in which a positive electrode plate and a negative electrode plate respectively coated with the positive electrode active material and the negative electrode active material are arranged with a separator being interposed therebetween, and a cylindrical battery can serving as an exterior for sealing and accommodating the electrode assembly along with an electrolyte.

Recently, the secondary battery is widely used in medium-sized and large-sized devices such as vehicles and power storage systems as well as small-sized devices such as portable electronic devices. When used in the medium-sized and large-sized devices, a large number of secondary batteries are electrically connected to increase capacity and output power.

Meanwhile, in recent years, as the need for a large-capacity structure increases as well as utilization as an energy storage source, the demand for a battery pack in which a plurality of battery modules, each having a plurality of secondary batteries electrically connected in series and/or in parallel, are aggregated is increasing.

In addition, the battery module generally includes a module housing made of plastic material in order to protect the plurality of secondary batteries from external impacts and also accommodate and store the plurality of secondary batteries. For example, an accommodation portion may be formed in the module housing as a separate space for accommodating the plurality of secondary batteries.

However, the process of accommodating a plurality of cylindrical battery cells in the module housing is a cumbersome and difficult task, which is not easily performed by machine automation and thus generally performed manually by workers.

Moreover, as a production automation system capable of greatly increasing the safety and production efficiency is widely used in recent years, industrial robots or the like put into each manufacturing process of the battery module are widely used.

However, as a large number of industrial robots are required for each of various manufacturing processes of the battery module, manufacturing equipment costs have been increased sharply, which may it difficult to secure price competitiveness of products.

DISCLOSURE

Technical Problem

The present disclosure is designed to solve the problems of the related art, and therefore the present disclosure is directed to providing a manufacturing apparatus including a robot arm, which may increase production efficiency and greatly reduce the size of manufacturing equipment.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a manufacturing apparatus, which comprises a robot arm to manufacture a battery module that includes a plurality of cylindrical battery cells and a module housing having an upper case and a lower case configured to accommodate the plurality of cylindrical battery cells,
 wherein the robot arm includes:
  a first gripper configured to hold or release the plurality of cylindrical battery cells;
  a second gripper configured to hold or release the upper case; and
  a third gripper configured to hold or release the lower case.
 Moreover, the robot arm may further include:
  a disk having a plate shape with upper and lower surfaces relatively broader than side surfaces thereof so that the first gripper, the second gripper and the third gripper are mounted thereto;
  a driving shaft having a longitudinal terminal portion rotatably connected to the disk to rotate the disk; and
  a rotary driving unit configured to move the terminal portion of the driving shaft in an upper direction or in a lower direction.
 In addition, the first gripper may include:
  a plurality of first tong units configured to hold or release the plurality of cylindrical battery cells, respectively;
  a plurality of first tong driving units respectively connected to ends of the plurality of first tong units and configured to control the taking and releasing operation of each of the plurality of first tong units; and
  a fixing frame connected to the plurality of first tong driving units and having a portion coupled to the disk.
 Further, a dented groove dented in an outer direction of the first tong unit not to press a top portion of the cylindrical battery cell may be formed at an inner side of the first tong unit facing the cylindrical battery cell.
 In addition, the fixing frame may include:
  a movable bar having a body portion with an outer side to which the first tong driving unit is mounted and a bolt coupled to one side of the body portion;
  a fixing member having a guide hole perforated such that a portion of the bolt is inserted therein to guide the movable bar to move in a longitudinal direction of the bolt; and an elastic member configured to apply a predetermined force to the movable bar in the longitudinal direction of the bolt.

Moreover, the fixing frame may include an erroneous assembling sensor unit configured to detect erroneous assembling while the first tong unit is inserting the cylindrical battery cell into a hollow formed at the lower case.

Also, the erroneous assembling sensor unit may include a laser sensor formed at the fixing member to detect whether the bolt of the movable bar is moved upward.

Further, the second gripper may include:
a second tong unit having a plurality of pressing plates configured to press both sides of the upper case and a movable shaft configured to move in a direction along which the plurality of pressing plates move closer to each other or farther from each other;
at least one second tong driving unit configured to control a movement of the movable shaft; and
a pressing member connected to the disk and configured to press the upper case toward the lower case.

In addition, the third gripper may include:
a third tong unit having a plurality of finger units of a bent shape configured to move closer to each other or farther from each other and a pressing bar connected to a terminal portion of the finger unit to press both horizontal sides of the lower case;
at least one third tong driving unit configured to control an operation of the finger unit; and
a hook connected to the pressing bar and configured to be hooked to a bottom portion of the lower case.

Further, in another aspect of the present disclosure, there is also provided a manufacturing method, which manufactures a battery module by using the manufacturing apparatus.

In addition, in another aspect of the present disclosure, there is also provided a battery module, which is manufactured by the manufacturing apparatus.

Advantageous Effects

According to an embodiment of the present disclosure, since the dented groove is formed at the first tong unit of the present disclosure, it is possible to effectively prevent the cylindrical battery cell included in the battery module from being damaged or defected while the first tong unit picks and holds the top portion of the cylindrical battery cell.

Also, according to an embodiment of the present disclosure, since the fixing frame includes a movable bar elastically movable in the longitudinal direction of the bolt by using an elastic member connected to the first tong driving unit, the movable bar of the fixing frame may elastically absorb the impact generated while the first gripper receives the cylindrical battery cell in the accommodation portion of the lower case. That is, the manufacturing apparatus of the present disclosure may reduce the impact applied to the cylindrical battery cell during the manufacturing process, thereby minimizing the defect of the battery cells of the battery module.

In addition, according to an embodiment of the present disclosure, since the fixing frame includes the erroneous assembling sensor unit, it is possible to detect erroneous assembling while the cylindrical battery cell is being inserted into the hollow formed at the lower case. By doing so, it is possible to prevent the cylindrical battery cell from being exploded or ignited due to an impact that may occur since the plurality of cylindrical battery cells are erroneously assembled. Further, the manufacturing apparatus has an effect of reducing the defects of the plurality of cylindrical battery cells.

Moreover, according to an embodiment of the present disclosure, since the second gripper includes the pressing member configured to press the upper case toward the lower case, it is possible to help that the upper case is perfectly coupled to the upper portion of the lower case. Moreover, since the pressing member may press the upper case downward when the second tong unit places the upper case on the upper portion of the lower case, the coupling work may be performed efficiently.

In addition, according to an embodiment of the present disclosure, since the third gripper includes the hook formed at the pressing bar, the pressing bar may pick and hold the lower case while pressing both sides of the lower case and simultaneously the hook may support the lower surface of the lower case upward, thereby effectively preventing accidents such as a case where the third tong driving unit drops the lower case.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
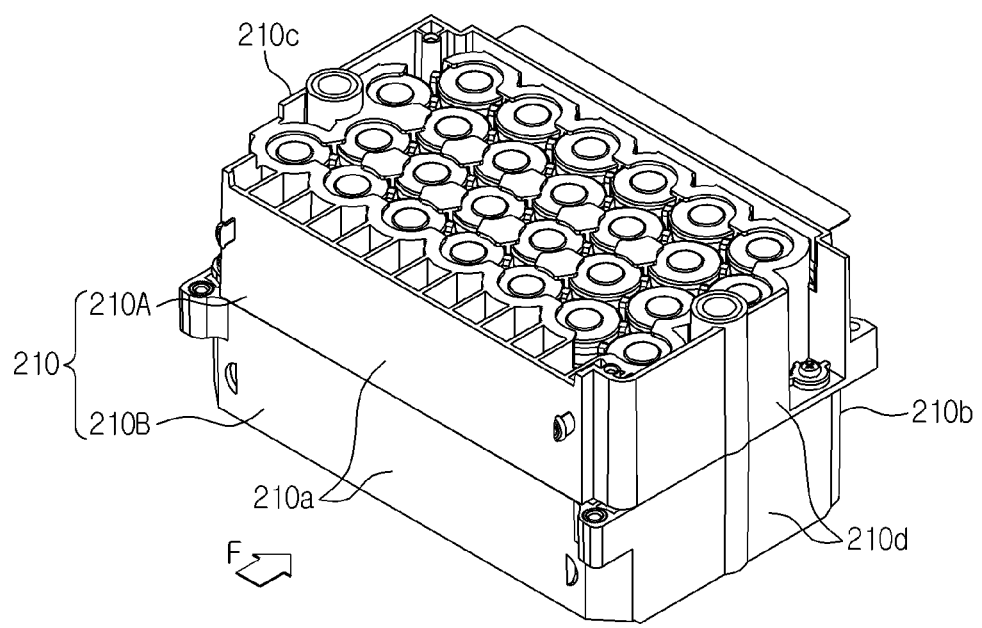
FIG. 1 is a perspective view schematically showing a battery module manufactured by a manufacturing apparatus according to an embodiment of the present disclosure.
Figure 2:
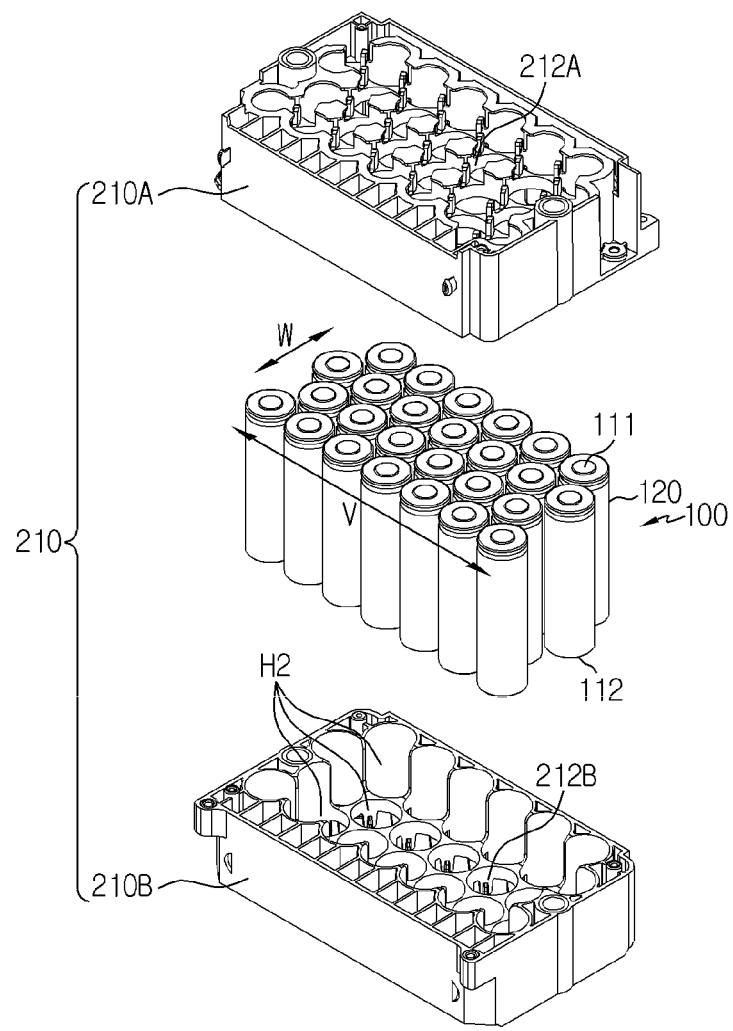
FIG. 2 is an exploded perspective view schematically showing components of the battery module manufactured by the manufacturing apparatus according to an embodiment of the present disclosure.
Figure 3:
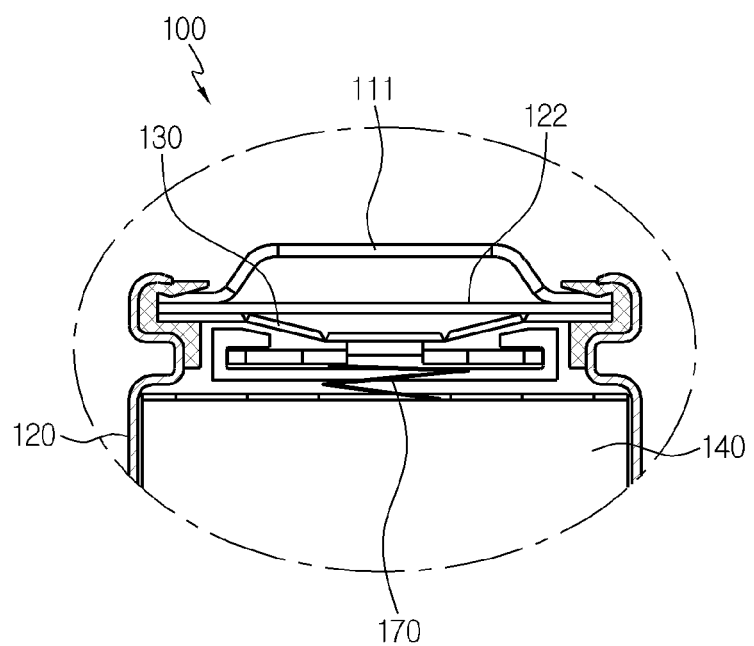
FIG. 3 is a partially sectioned view schematically showing an internal structure of a cylindrical battery cell, employed at the battery module of FIG. 2.
Figure 4:
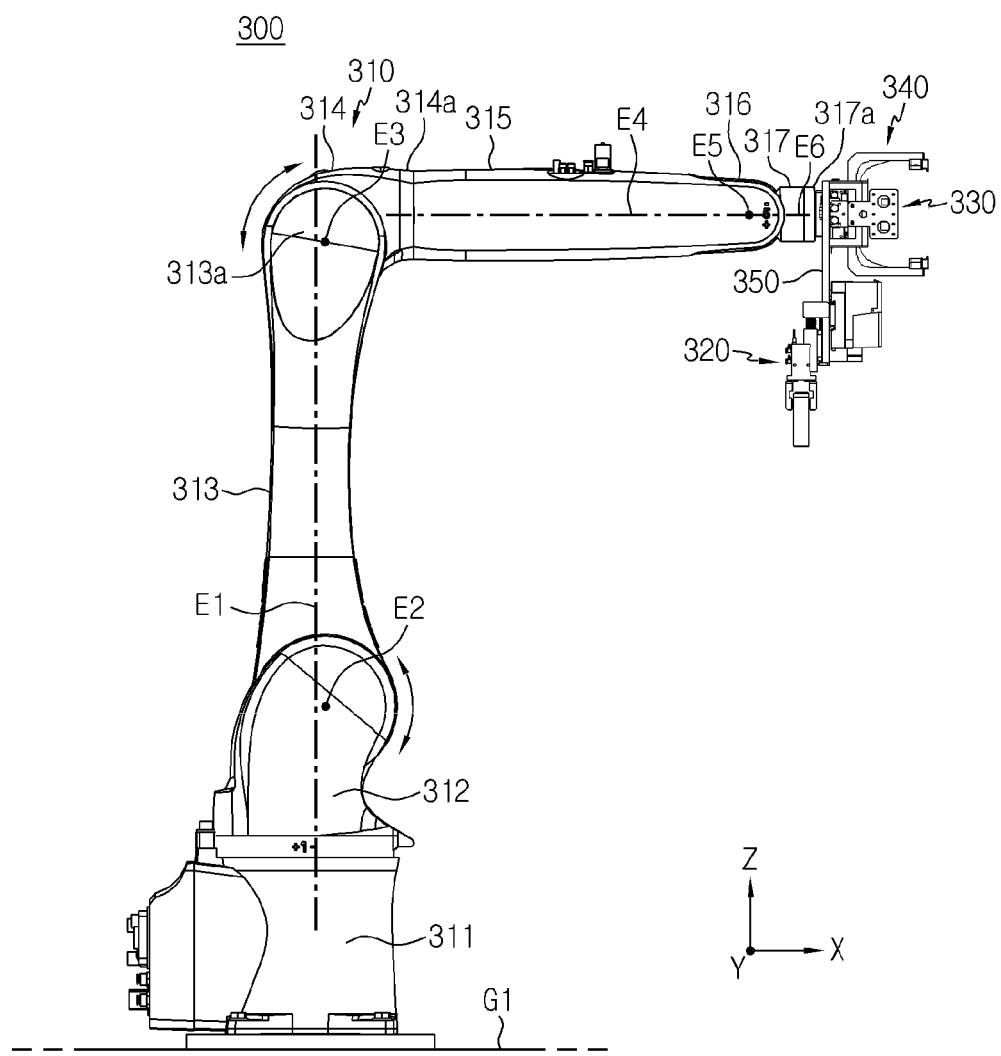
FIG. 4 is a side view schematically showing the manufacturing apparatus according to an embodiment of the present disclosure.

FIG. 1 is a perspective view schematically showing a battery module manufactured by a manufacturing apparatus according to an embodiment of the present disclosure. FIG. 2 is an exploded perspective view schematically showing components of the battery module manufactured by the manufacturing apparatus according to an embodiment of the present disclosure. FIG. 3 is a partially sectioned view schematically showing an internal structure of a cylindrical battery cell, employed at the battery module of FIG. 2. FIG. 4 is a side view schematically showing the manufacturing apparatus according to an embodiment of the present disclosure.

Referring to FIGS. 1 to 4, a manufacturing apparatus 300 according to an embodiment of the present disclosure includes a robot arm 310 to manufacture a battery module 200.

Here, the battery module 200 may include a plurality of cylindrical battery cells 100 and a module housing 210. Specifically, the cylindrical battery cell 100 may include a cylindrical battery can 120 and an electrode assembly 140 (FIG. 3) accommodated in the battery can 120.

Here, the battery can 120 may include a material with high electric conductivity. For example, the battery can 120 may include an aluminum or copper material.

In addition, the battery can 120 may be configured to stand up in a long shape in an upper and lower direction. Also, the battery can 120 may have a cylindrical shape extending in the upper and lower direction. Moreover, electrode terminals 111, 112 may be formed at upper and lower portions of the battery can 120, respectively. Specifically, a first electrode terminal 111 protruding in an upper direction may be formed on a flat circular upper surface at a top portion of the battery can 120, and a second electrode terminal 112 may be formed on a flat circular lower surface at a bottom portion of the battery can 120.

Further, the cylindrical battery cells 100 may be arranged in a plurality of columns and rows in a horizontal direction. Here, the horizontal direction may refer to a direction parallel to the ground when the cylindrical battery cell 100 is placed on the ground and may also be referred to as at least one direction on a plane perpendicular to the upper and lower direction.

For example, as shown in FIG. 2, the battery module 200 may include a plurality of cylindrical battery cells 100 arranged in four columns in the front and rear direction W and in seven or six rows in the left and right direction V.

In addition, the electrode assembly 140 (FIG. 3) may be formed in a structure where a positive electrode and a negative electrode are wound in a jelly-roll type with a separator being interposed therebetween. A positive electrode tab 170 may be attached to the positive electrode (not shown) and connected to the first electrode terminal 111 at the top portion of the battery can 120. A negative electrode tab (not shown) may be attached to the negative electrode (not shown) and connected to the second electrode terminal 112 at the bottom portion of the battery can 120.

Referring to FIG. 3 again along with FIG. 2, a top cap 110 is formed at the cylindrical battery cell 100 in a protruding form to form the electrode terminal 111, and a portion of the top cap 110 is perforated when an internal gas reaches a specific air pressure or higher.

In addition, the cylindrical battery cell 100 may include a safety element 122 (for example, a positive temperature coefficient (PTC) element, a thermal cutoff (TCO), or the like) for blocking a current by greatly increasing a battery resistance when the temperature inside the battery cell rises. Also, the cylindrical battery cell 100 may have a safety vent structure 130 that has a downwardly protruding shape in a normal state but protrudes and ruptures to exhaust gas when the pressure inside the battery rises.

However, the battery module 200 according to the present disclosure is not limited to the aforementioned cylindrical battery cell 100, and various cylindrical battery cell 100 known at the time of filing of this application may be employed.

Meanwhile, the module housing 210 may include an upper case 210A and a lower case 210B.

In addition, the upper case 210A and the lower case 210B of the module housing 210 may include accommodation portions 212A, 212B for accommodating the cylindrical battery cell 100 therein, respectively. Specifically, the accommodation portions 212A, 212B may have a plurality of hollow H2 formed to surround outer surfaces of the cylindrical battery cells 100.

In addition, the module housing 210 may include a first outer wall 210a, a second outer wall 210b, a third outer wall 210c and a fourth outer wall 210d configured to form an inner space and provided at front, rear, left and right sides.

Referring to FIG. 4 again, the robot arm 310 may include a pillar portion 311, a first connection portion 312, a second connection portion 313, a third connection portion 314, a fourth connection portion 315, a rotary driving unit 316 (FIG. 7), and a driving shaft 317.

Specifically, the pillar portion 311 may be a portion connected to a bottom surface on which the robot arm 310 is installed. In addition, the pillar portion 311 may be configured to allow the first connection portion 312 of the robot arm 310 to rotate based on a rotary shaft E1 in the upper and lower directions (a Z-axis direction). For example, the pillar portion 311 may incorporate an electric motor (not shown).

Further, the first connection portion 312 may be connected to an upper portion of the pillar portion 311. In addition, the first connection portion 312 may be configured to move up and down a terminal portion (a top portion) 313a of the second connection portion 313 at a side corresponding to a direction where the first connection portion 312 is located. To this end, the first connection portion 312 may be connected to one end (a bottom portion) of the second connection portion 313. Further, the first connection portion 312 may have an electric motor (not shown) to rotate the second connection portion 313 based on a rotary shaft E2 in a Y-axis direction.

In addition, the second connection portion 313 may be configured to move up and down a terminal portion 314a of the third connection portion 314 at a side corresponding to a direction where the second connection portion 313 is located. To this end, the second connection portion 313 may be connected to one end of the third connection portion 314. Further, the second connection portion 313 may have an electric motor (not shown) to rotate the third connection portion 314 based on a rotary shaft E3 in the Y-axis direction.

Also, the third connection portion 314 may be connected to one end of the fourth connection portion 315. Further, the third connection portion 314 may have an electric motor (not shown) to rotate the fourth connection portion 315 based on a rotary shaft E4 in an X-axis direction.

Further, the fourth connection portion 315 may be connected to both sides (see 316 of FIG. 7) of the rotary driving unit 316. The fourth connection portion 315 may have an electric motor (not shown) to rotate the rotary driving unit 316 based on a rotary shaft E5 in the Y-axis direction.

Moreover, the manufacturing apparatus 300 of the present disclosure may include a central control unit (not shown). The central control unit may be configured to control the rotation of the first connection portion 312, the second connection portion 313, the third connection portion 314 and the fourth connection portion 315. In addition, the central control unit may be configured to control the operation of the driving shaft 317, the rotary driving unit 316, a first gripper 320, a second gripper 330 and a third gripper 340, explained later. Further, the central control unit may be connected to a manipulation unit directly controlled by a worker. In addition, the central control unit may be operated according to a program including execution instructions of the robot arm required for the manufacturing process.

In addition, the rotary driving unit 316 may be configured to move a terminal portion 317a of the driving shaft 317 upward or downward. Further, the rotary driving unit 316 may be shaped such that one end of the driving shaft 317 is inserted therein.

In addition, the driving shaft 317 may be configured to rotate based on a rotary shaft E6 in the X-axis direction. Namely, the driving shaft 317 may move in two directions such that the terminal portion 317a moves in the upper and lower direction (the Z-axis direction) and in the clockwise or counterclockwise direction (the X-axis direction).

Figure 5:
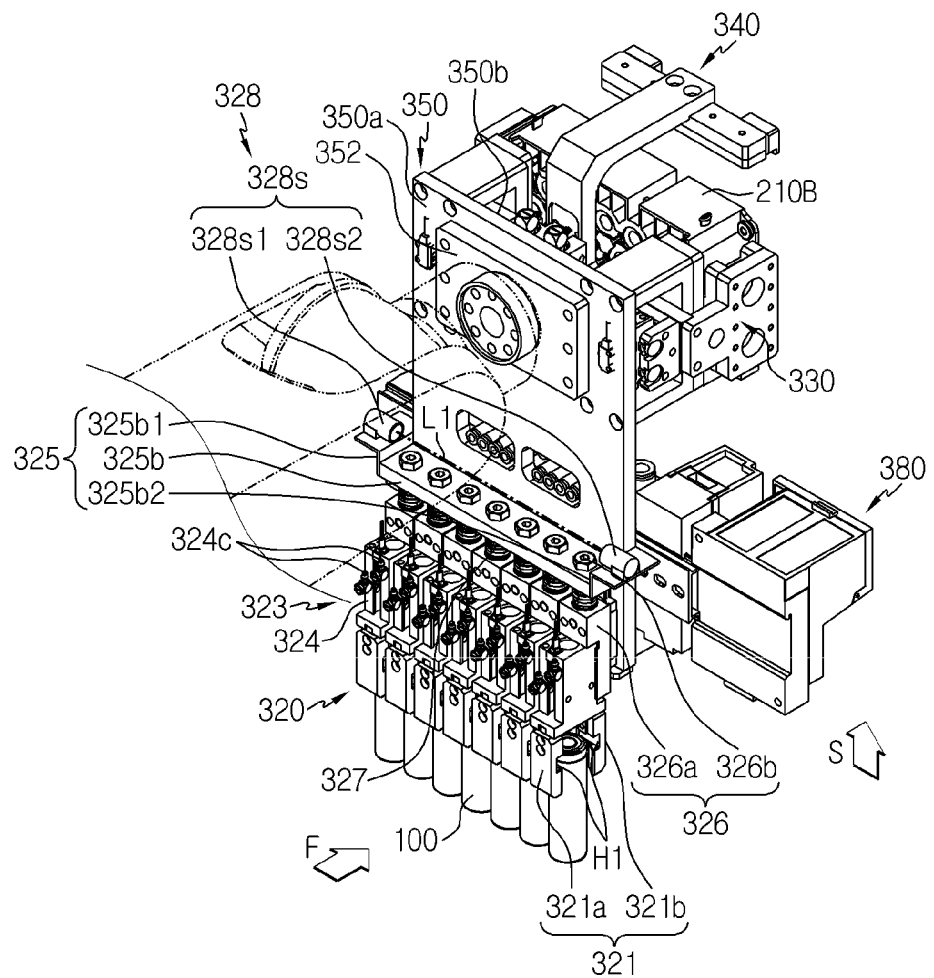
FIG. 5 is a partial perspective view schematically showing a portion of the manufacturing apparatus according to an embodiment of the present disclosure.

FIG. 5 is a partial perspective view schematically showing a portion of the manufacturing apparatus according to an embodiment of the present disclosure.

Referring to FIG. 5 along with FIGS. 1 and 4, the robot arm 310 may include a first gripper 320, a second gripper 330 and a third gripper 340. In addition, the first gripper 320 may be configured to hold or release the plurality of cylindrical battery cells 100. Further, the second gripper 330 may be configured to hold or release the upper case 210A. In addition, the third gripper 340 may be configured to hold or release the lower case 210B.

Further, the robot arm 310 may include a plate (hereinafter also referred to as a disk) 350 to which the first gripper 320, the second gripper 330 and the third gripper 340 are mounted. Specifically, the plate (or disk) 350 may have a plate shape with upper and lower surfaces 350a, 350b relatively broader than side surfaces thereof. Moreover, a terminal portion of the driving shaft 317 in an axial direction may be connected to one broad surface 350a of the disk 350 via a coupling member 352.

In addition, the driving shaft 317 may be configured to rotate based on the rotary shaft E6 in the X-axis direction of FIG. 4 so that the disk 350 is rotated. Further, the terminal portion of the driving shaft 317 moves along the rotary shaft E5 in the upper and lower direction (the Z-axis direction), and the broad upper and lower surfaces 350a, 350b of the disk 350 may be shaped to stand up in a direction perpendicular to the ground G1 or located in parallel to the ground G1.

However, the rotating directions of the first connection portion 312, the second connection portion 313, the third connection portion 314, the fourth connection portion 315, the rotary driving unit 316 and the driving shaft 317 are not limited to the X-axis direction, Y-axis direction or the Z-axis direction, but depending on the situation, whenever the locations of the first connection portion 312, the second connection portion 313, the third connection portion 314, the fourth connection portion 315, the rotary driving unit 316 and the driving shaft 317 of the robot arm 310 are changed, the rotating directions of the components may be changed three-dimensionally.

More specifically, the first gripper 320 may include a plurality of first tong units 321, a plurality of first tong driving units 323, and a fixing frame 325.

Here, when viewed in an F direction of FIG. 5, the plurality of first tong units 321 may be configured to hold or release the plurality of cylindrical battery cells 100, respectively. Specifically, the first tong unit 321 may include a pair of fingers 321a, 321b extending in a longitudinal direction. In addition, an upper portion of the pair of fingers 321a, 321b in the longitudinal direction may be connected to the first tong driving unit 323. Further, by the first tong driving unit 323, a lower portion of the pair of fingers 321a, 321b may be configured to hold or release one cylindrical battery cell 100. Also, a dented groove H1 dented in an outer direction may be formed at an inner side of the first tong unit 321 facing the cylindrical battery cell 100 so as not to press a top portion of the cylindrical battery cell 100.

That is, the top portion of the cylindrical battery cell 100 is a region where components such as a safety element and a safety vent structure easily damaged or defected even by a weak impact are location, and these components may be damaged just by a pressing force of the first tong unit 321 for holding the top portion of the cylindrical battery cell 100.

For example, as shown in FIG. 5, the first tong unit 321 may include a pair of fingers 321a, 321b. In addition, dented grooves H1 dented in the outer direction may be formed at inner sides of the pair of fingers 321a, 321b facing the top portion of the cylindrical battery cell 100.

Thus, according to this configuration of the present disclosure, since the dented groove H1 is formed at the first tong unit 321 of the present disclosure, it is possible to prevent the top portion of the cylindrical battery cell 100 from being pressed while the first tong unit 321 picks and holds the cylindrical battery cell 100, thereby reducing damage or defect of the safety element 122 and the safety vent structure 130 of the cylindrical battery cell 100.

In addition, the first tong driving unit 323 may be configured to control the holding and releasing operation of each of plurality of first tong units 321. For example, the first tong driving unit 323 may have a pneumatic cylinder 324. Moreover, a cylinder (not shown) of the pneumatic cylinder 324 may be connected to the top portion of each of the plurality of first tong units 321. Also, the pneumatic cylinder 324 may have an injection hole 324c through which air is injected or sucked. Further, if air is injected into the injection hole 324c, the cylinder may move so that two fingers 321a, 321b of the first tong unit 321 become farther from each other, and if air is sucked into the injection hole, the cylinder may move so that the pair of fingers 321a, 321b of the first tong unit 321 become closer to each other.

Figure 6:
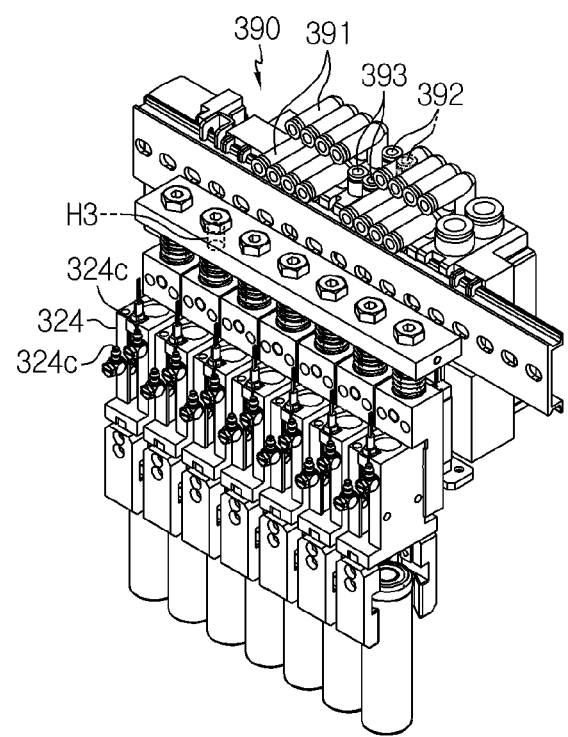
FIG. 6 is an exploded perspective view schematically showing a compressor and a first gripper, employed at the manufacturing apparatus according to an embodiment of the present disclosure.

FIG. 6 is an exploded perspective view schematically showing a compressor and a first gripper, employed at the manufacturing apparatus according to an embodiment of the present disclosure. For convenience of description, an air hose for connecting the air discharge hole of the compressor 390 and the injection hole of the pneumatic cylinder is not depicted.

Referring to FIG. 6 along with FIG. 5, the manufacturing apparatus 300 of the present disclosure may include a compressor 390 configured to supply a compressed air to the injection hole 324c of the pneumatic cylinder 324. Specifically, the compressor 390 may suck an external air, compress the external air and supply the compressed air to the injection hole 324c of the pneumatic cylinder 324 through an air discharge hole 391.

Further, the compressor 390 may have separate injection holes 392, 393 formed to supply the compressed air to a pneumatic cylinder 334 (FIG. 8) of the second gripper 330 and a pneumatic cylinder 344 (FIG. 8) of the third gripper 340, explained later.

Meanwhile, a portion of the fixing frame 325 may be coupled to the disk 350. In addition, the fixing frame 325 may be connected to the plurality of first tong driving units 323.

Specifically, the fixing frame 325 may include a movable bar 326, a fixing member 325b and an elastic member 327. Further, the movable bar 326 may have a body portion 326a formed at an outer side thereof so that the first tong driving unit 323 is mounted thereto, and a bolt 326b coupled to one side of the body portion 326a.

For example, as shown in FIG. 5, the body portion 326a of the movable bar 326 may be spaced apart from the disk 350 and one broad surface 350a by a predetermined distance. In addition, the first tong driving unit 323 may be mounted to an outer side of the body portion 326a. Further, a bolt 326b standing upright may be formed at a top of the body portion 326a.

Further, referring to FIG. 6 along with FIG. 5, when viewed in the F direction, the fixing member 325b may have a plate shape extending in a direction perpendicular to one broad surface 350a of the disk 350. In addition, both ends 325b1, 325b2 of the fixing member 325b may be bent in the upper direction and bent again in the left and right direction. Further, the fixing member 325b may have a plurality of guide holes H3 through which the bolt 326b is movably provided in the upper and lower direction so as to guide the movement of the bolt 326b of the movable bar 326 in the longitudinal direction. Further, the guide hole H3 (FIG. 5) may be perforated in the longitudinal direction (the upper and lower direction) of the bolt 326b so that a portion of the bolt 326b is inserted therein.

For example, as shown in FIG. 5, the fixing member 325b may be positioned at one broad surface 350a of the disk 350 to extend perpendicular to one broad surface 350a of the disk 350. Further, a portion (an inner portion) of the fixing member 325b may be coupled to the disk 350. In addition, seven guide holes H3 may be formed in the fixing member 325b. Also, seven bolts 326b of the first tong driving unit 323 may be inserted into the seven guide holes H3, respectively.

Further, a head of the bolt 326b may be blocked at the periphery of the guide hole H3 so that the first tong driving unit 323 may have a fixed shape. That is, the guide hole H3 may have a smaller size than the head of the bolt 326b.

Moreover, the elastic member 327 may be configured to apply a predetermined force to the movable bar 326 in an upper direction and/or in a lower direction. For example, as shown in FIG. 5, the elastic member 327 may be a spring. In addition, the spring may be inserted into a shaft portion of the bolt 326b. Moreover, the spring may be located between the lower portion of the fixing member 325b and the movable bar 326a of the first tong driving unit 323.

Accordingly, as shown in FIG. 6, if the first tong unit 321 of the first gripper 320 receives a force in the upper direction S, the first tong driving unit 323 connected to the first tong unit 321 is moved in the upper direction S, and at the same time, the first movable bar 326 connected to the first tong driving unit 323 may also be moved in the upper direction S. In this case, the elastic member 327 may be configured to apply a predetermined force in the lower direction. That is, the elastic member 327 may be formed to buffer the force in the upper direction S received by the first tong unit 321. Further, the elastic member 327 may prevent the bolt 326b of the movable bar 326 from moving upward over a predetermined height even with a small force.

Thus, according to this configuration of the present disclosure, since the fixing frame 325 is configured such that the movable bar 326 connected to the first tong driving unit 323 is elastically movable in the longitudinal direction (the upper direction) of the bolt 326b by using the elastic member 327, the elastic member 327 of the fixing frame 325 may absorb (buffer) the impact generated while the first gripper 320 receives the cylindrical battery cell 100 in the accommodation portion 212B of the lower case 210B. That is, the manufacturing apparatus 300 of the present disclosure may reduce the impact applied to the cylindrical battery cell 100 during the manufacturing process, thereby minimizing the defect of the battery cells 100 of the battery module 200.

Meanwhile, referring to FIG. 5 again along with FIG. 2, the fixing frame 325 may include an erroneous assembling sensor unit 328 configured to detect erroneous assembling while the first tong unit 321 is inserting the cylindrical battery cell 100 into the hollow formed at the lower case 210B.

Specifically, the erroneous assembling sensor unit 328 may include a laser sensor 328s. In addition, the laser sensor 328s may include a light emission portion 328s1 for outputting a laser and a light receiving portion 328s2 configured to detect a laser output from the light emission portion 328s1. Moreover, the laser sensor 328s may be formed at the fixing member 325b to detect whether the bolt 326b of the movable bar 326 is moved upward. More specifically, the light emission portion 328s1 and the light receiving portion 328s2 of the laser sensor 328s may be formed at both ends of the fixing member 325b, respectively.

In addition, if the laser L1 output from the light emission portion 328s1 does not reach the light receiving portion 328s2, namely if the bolt 326b of the movable bar 326 moves upward to block the moving direction of the laser L1, the laser sensor 328s may detect the situation where the laser L1 has not reached the light receiving portion 328s2.

For example, as shown in FIG. 5, seven movable bars 326 may be mounted to the fixing member 325b. In addition, the seven bolts 326b of the seven movable bars 326 may be inserted into seven guide holes H3 (FIG. 6) formed in the fixing member 325b. Also, the light emission portion 328s1 and the light receiving portion 328s2 of the laser sensor 328s may be formed at both ends 325b1, 325b2 in a direction along which the guide holes H3 of the fixing member 325b are arranged, respectively. Further, the laser sensor 328s may be positioned to face the light emission portion 328s1 and the light receiving portion 328s2 in order to detect whether the bolt 326b of the movable bar 326 is moved upward.

Thus, according to this configuration of the present disclosure, since the fixing frame 325 includes the erroneous assembling sensor unit 328, it is possible to detect erroneous assembling while the cylindrical battery cell 100 is being inserted into the hollow formed at the lower case 210B. Thus, it is possible to prevent the cylindrical battery cell 100 from being exploded or ignited due to an impact that may occur since the plurality of cylindrical battery cells 100 are erroneously assembled. Further, the manufacturing apparatus 300 has an effect of reducing the defects of the plurality of cylindrical battery cells 100.

Figure 7:
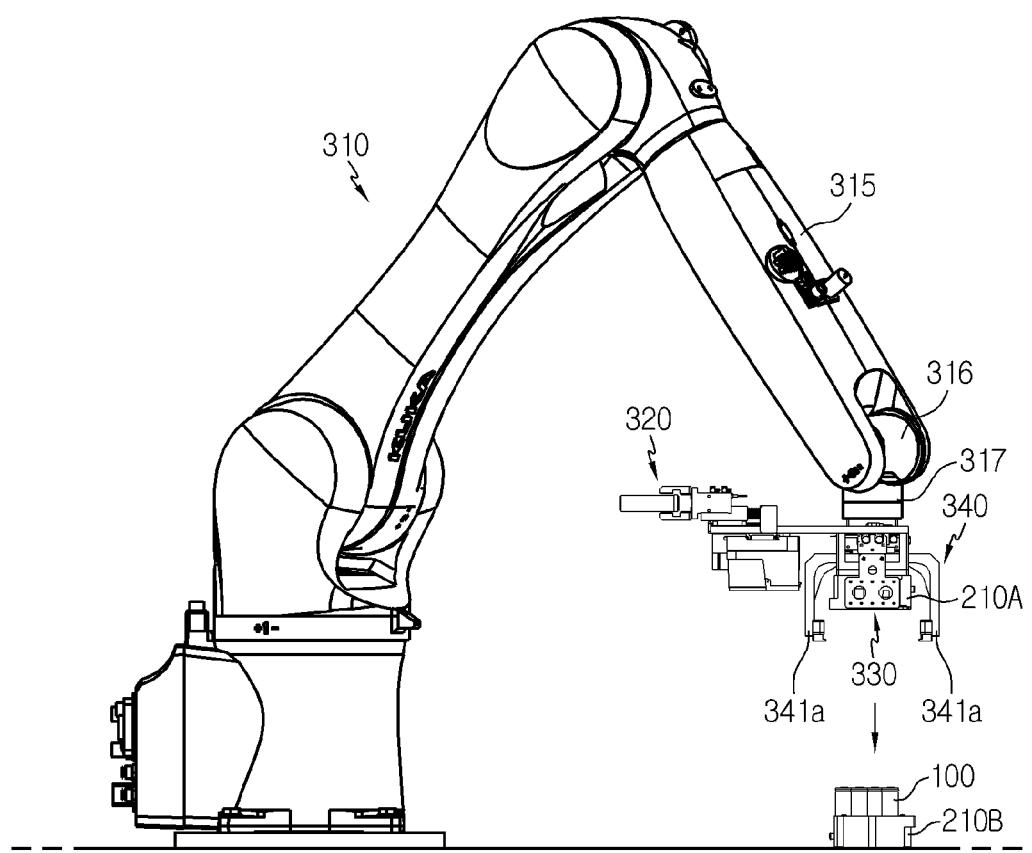
FIG. 7 is a partially sectioned view schematically showing another operation of the manufacturing apparatus according to an embodiment of the present disclosure.
Figure 8:
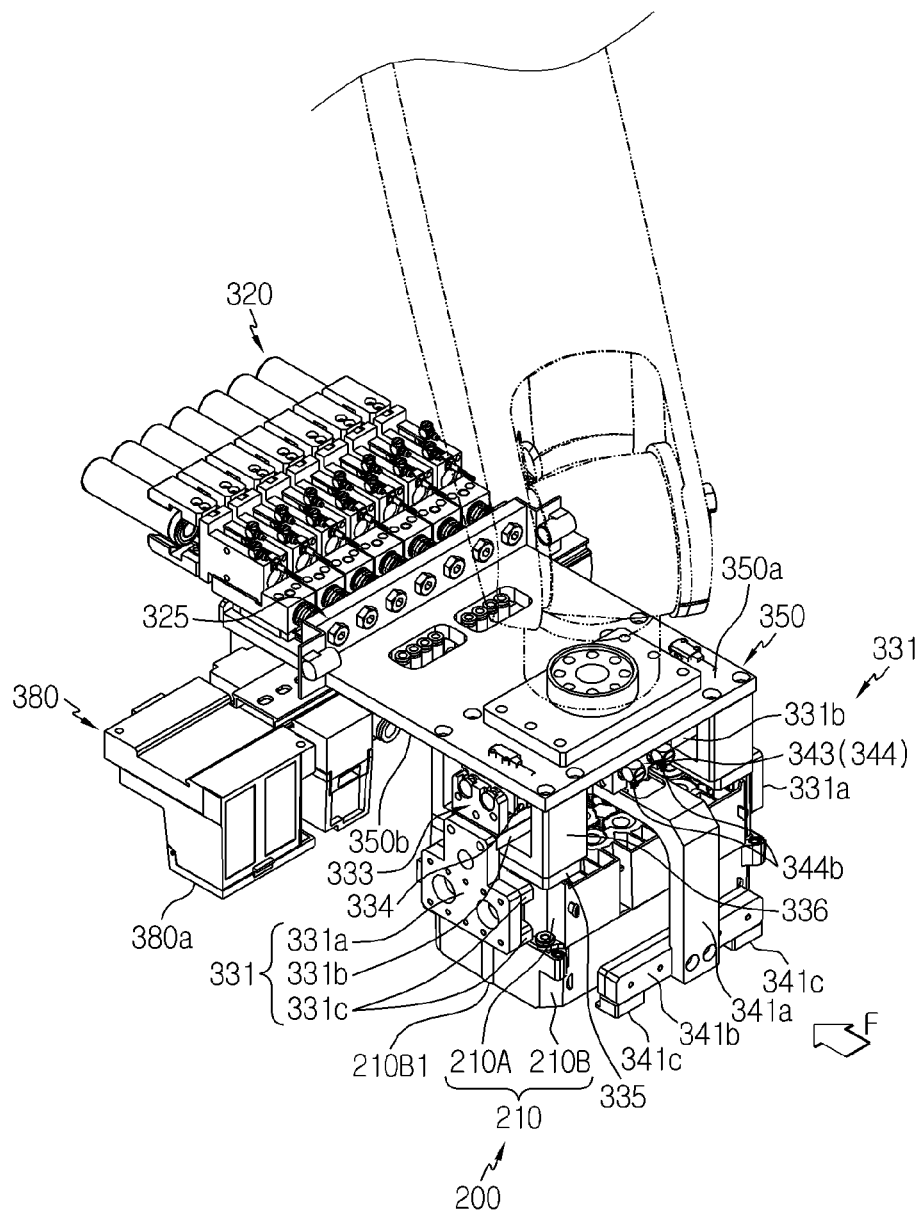
FIG. 8 is a partially sectioned view schematically showing another operation of the manufacturing apparatus according to an embodiment of the present disclosure.

FIG. 7 is a partially sectioned view schematically showing another operation of the manufacturing apparatus according to an embodiment of the present disclosure. Also, FIG. 8 is a partially sectioned view schematically showing another operation of the manufacturing apparatus according to an embodiment of the present disclosure. For reference, FIG. 7 shows a situation where the robot arm 310 moves the upper case 210A of the module housing 210 to the upper portion of the lower case 210A by using the second gripper 330.

Referring to FIGS. 7 and 8, the second gripper 330 may include a second tong unit 331, a second tong driving unit 333, and a pressing member 336.

Specifically, the second tong unit 331 may include a pressing plate 331a and a movable shaft 331b. More specifically, the pressing plate 331a may be configured to press both sides of the upper case 210A. For example, as shown in FIG. 8, when viewed in the F direction, the second tong unit 331 may include two pressing plates 331a positioned at both sides of the upper case 210A of the battery module 200 in the horizontal direction (the left and right direction). Moreover, the pressing plates 331a may be configured to press both sides of the upper case 210A in the left and right direction by the movement of the movable shaft 331b.

In addition, the second tong unit 331 may include two movable shafts 331b extending long in a direction parallel to one broad surface 350a of the disk 350. Also, the pressing plate 331a may be coupled to an outer terminal portion of the movable shaft 331b, and an inner terminal portion (not shown) thereof may be connected to the second tong driving unit 333.

For example, the second tong driving unit 333 may include a pneumatic cylinder 334. Moreover, a cylinder (not shown) of the pneumatic cylinder 334 may be connected to the movable shaft 331b of the second tong unit 331. Further, the pneumatic cylinder 334 may have injection holes (not shown) through which air is injected or sucked. If air is injected into one of the two injection holes, two pressing plates 331a of the second tong unit 331 may move farther from each other, and if air is sucked into the injection hole, two pressing plates 331a of the second tong unit 331 may move closer the plates 331a closer to each other.

Moreover, the movable shaft 331b may be configured such that the plurality of pressing plates 331a may move in a direction along which they become closer to each other or farther from each other.

For example, as shown in FIG. 8, the second tong unit 331 may include two movable shafts 331b. In addition, the two movable shafts 331b may be configured such that the plurality of pressing plates 331a may move closer to each other or farther from each other.

In addition, at least one contact member 331c having a shape protruding from the inner surface of the pressing plate 331a toward the upper case 210A may be formed at an inner surface of the pressing plate 331a facing the outer surface the upper case 210A.

Meanwhile, the terms indicating directions such as front, rear, left, right, upper and lower may vary depending on the position of an observer or the shape of an object. However, in this specification, for convenience of description, the front, rear, left, right, upper and lower directions are distinguished based on the case where viewed in the F direction.

For example, as shown in FIG. 8, the second tong unit 331 may include two pressing plates 331a. In addition, two contact members 331c having a shape protruding toward the upper case 210A may be formed at inner surfaces of the two pressing plates 331a, respectively. Further, the contact member 331c may be formed at a position where the contact member 331c may avoid pressing a structure or component such as a protrusion formed on the outer wall of the upper case 210A.

Thus, according to this configuration of the present disclosure, since the contact member 331c is formed at the pressing plate 331a of the second tong unit 331, it is possible to prevent the case 210A from being damaged or dropped since the second gripper 330 presses an inappropriate site while holding the upper case 210A.

In addition, the second gripper 330 may include a pressing member 336 configured to press the upper case 210A toward the lower case 210B. Specifically, the pressing member 336 may be connected to the other surface (the lower surface) 350b of the disk 350. Further, the pressing member 336 may be configured to protrusively extend in a direction perpendicular to the lower surface 350b that is relatively broader than the horizontal side surface of the disk 350.

For example, as shown in FIG. 8, two pressing members 336 may be coupled to the lower surface 350b of the disk 350. In addition, the pressing member 336 may have a bar shape whose both longitudinal ends are bent upward. Further, a buffer pad 335 having a soft material whose volume is easily changed may be formed at the lower portion of the pressing member 336.

In addition, the movable shaft 331b of the second tong unit 331 may be positioned between both bent ends of the pressing member 336. For example, as shown in FIG. 8, two pressing members 336 may be formed at the lower surface 350b of the disk 350. Moreover, the movable shaft 331b of the second tong unit 331 may be positioned to penetrate through the open center of the two pressing members 336, respectively.

Thus, according to this configuration of the present disclosure, since the second gripper 330 includes the pressing member 336 configured to press the upper case 210A toward the lower case 210B, it is possible to help that the upper case 210A is perfectly coupled to the upper portion of the lower case 210B. Moreover, since the pressing member 336 may press the upper case 210A downward when the second tong unit 331 places the upper case 210A on the upper portion of the lower case 210B, the coupling work may be performed efficiently.

Referring to FIGS. 7 and 8 again, the third gripper 340 may include a third tong unit 341, at least one third tong driving unit 343, and a hook 341c.

Specifically, the third tong unit 341 may include a plurality of finger units 341a and a pressing bar 341b connected to a terminal portion of the finger unit 341a in a direction (a lower direction) away from the disk 350. In addition, both ends of the plurality of finger units 341a may be bent downward. Moreover, the plurality of finger units 341a may be moved closer to each other or farther from each other. Also, the pressing bar 341b may be formed to extend lone along the outer surface of the lower case 210B to press both horizontal sides of the lower case 210B.

Further, the third tong driving unit 343 may be configured to control the operation of the finger unit 341a. For example, the third tong driving unit 343 may include a pneumatic cylinder 344. Moreover, a cylinder (not shown) of the pneumatic cylinder 344 may be connected to one end of finger unit 341a of the third tong unit 341. In addition, the pneumatic cylinder 344 may have an injection hole 344b through which air is injected or sucked. Further, if air is injected into the injection hole 344b, two finger units 341a of the third tong unit 341 may move farther from each other, and if air is sucked into the injection hole 344b, two finger units 341a of the third tong unit 341 may move closer to each other.

In addition, the hook 341c may also be connected to a lower portion of the pressing bar 341b (an end away from the disk 350). Specifically, the hook 341c may protrusively extend in the shape of the hook 341c from the pressing bar 341b toward the lower case 210B (in a direction closer to the two finger unit 341a) so that a portion of the hook 341c contacts the lower surface 210B1 of the lower case 210B.

For example, as shown in FIG. 8, two hooks 341c may be formed at both longitudinal ends of the pressing bar 341b, respectively. Moreover, the hook 341c may be positioned such that the pressing bar 341b presses the outer surface of the lower case 210B and simultaneously a sharp portion of the hook 341c contacts the lower surface 210B1 of the lower case 210B.

Thus, according to this configuration of the present disclosure, since the third gripper 340 includes the hook 341c formed at the pressing bar 341b, the pressing bar 341b may pick and hold the lower case 210B while pressing both sides of the lower case 210B and simultaneously the hook 341c may support the lower surface 210B1 of the lower case 210B upward, thereby effectively preventing accidents such as a case where the third tong driving unit 343 drops the lower case 210B.

Referring to FIG. 8 again, an arrangement unit 380 configured to evenly arrange the inserted heights of the plurality of cylindrical battery cells 100 accommodated in the lower case 210B may be formed at the other surface 350b of the disk 350. Specifically, the arrangement unit 380 may have a pressing surface 380a configured to press the upper portion of the plurality of cylindrical battery cells 100 (FIG. 2) accommodated in the lower case 210B (FIG. 2) downward.

In addition, the arrangement unit 380 may be located in a direction corresponding to the direction in which the fixing frame 325 is located. That is, if the fixing frame 325 is located at one side surface 350a (an upper surface) of the disk 350, the arrangement unit 380 may be located at the other side surface 350b (a lower surface) of the disk 350.

For example, as shown in FIG. 8, the arrangement unit 380 may be formed at the other side surface 350b of the disk 350. In addition, the arrangement unit 380 may have a pressing surface 380a with a size corresponding to the upper surface of the lower case 210B. Further, the pressing surface 380a may be configured to press the upper portion of the plurality of cylindrical battery cells 100 downward.

Meanwhile, referring to FIG. 5 along with FIG. 2, the present disclosure provides a method of manufacturing the battery module 200 by using the manufacturing apparatus 300.

Specifically, the manufacturing method may include a process in which the first gripper 320 picks and holds a plurality of cylindrical battery cells 100 arranged in one direction, a process in which the first gripper 320 inserts the plurality of cylindrical battery cells 100 into the hollows H2 formed at the lower case 210B and then releases the plurality of cylindrical battery cells 100, a process in which the second gripper 330 picks and holds the upper case 210A, a process in which the second gripper 330 places the upper case 210A at the upper portion of the lower case 210B and presses the upper case 210A onto the lower case 210B, a process in which the third gripper 340 picks and holds the lower case 210B to which the upper case 210A is mounted, and a process in which the robot arm 310 moves the assembled battery module 200 taken by the third gripper 340 to a set location.

Specifically, referring to FIG. 5, in the process in which the first gripper 320 picks and holds the plurality of cylindrical battery cells 100 arranged in one direction, the first gripper 320 moves to the upper portion of the plurality of cylindrical battery cells 100 arranged in one direction, and then the first tong unit 321a of the first gripper 320 may move downward and pick and hold the bodies of the plurality of cylindrical battery cells 100. At this time, as shown in FIG. 5, the robot arm 310 may move the first connection portion 312, the second connection portion 313, the third connection portion 314, the fourth connection portion 315, the rotary driving unit 316 (FIG. 7) and the driving shaft 317 such that the broad surface 350a of the disk 350 is arranged in the horizontal direction and the first gripper 320 is located at the lower portion of the disk 350.

Similarly, in each manufacturing process included in the manufacturing method, the robot arm 310 may move the first connection portion 312, the second connection portion 313, the third connection portion 314, the fourth connection portion 315, the rotary driving unit 316 (FIG. 7) and the driving shaft 317 such that the first gripper 320, the second gripper 330 or the third gripper 340 is moved and rotated to an appropriate position.

Meanwhile, the present disclosure may provide a battery module 200 that is manufactured by the manufacturing apparatus 300. In addition, the present disclosure may provide a battery pack (not shown) including a plurality of battery modules 200. Moreover, the battery pack may further include various devices for controlling charging and discharging of the plurality of cylindrical battery cells 100, such as a battery management system (BMS, not shown), a current sensor (not shown), a fuse (not shown), and the like.

In addition, the battery module 200 according to the present disclosure may be applied to a vehicle such as an electric vehicle or a hybrid electric vehicle. That is, the vehicle according to the present disclosure may include the battery module 200.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 300: manufacturing apparatus | 310: robot arm |
| 200: battery module | 100: cylindrical battery cell |
| 111, 112: electrode terminal | |
| 210: module housing | 210A, 210B: upper case, lower case |

| Reference Signs | |
|---|---|
| 320, 330, 340: first gripper, second gripper, third gripper | |
| 350: disk | 317, 316: driving shaft, rotary driving unit |
| 321, 331, 341: first tong unit, second tong unit, third tong unit | |
| 323, 333, 343: first tong driving unit, second tong driving unit, third tong driving unit | |
| 325: fixing frame | H1: dented groove |
| 326: movable bar | 325b: fixing member |
| 327: elastic member | 328: erroneous assembling sensor unit |
| 328s: laser sensor | 331a, 331b: pressing plate, movable shaft |
| 336: pressing member | 341a, 341b, 341c: finger unit, pressing bar, hook |

INDUSTRIAL APPLICABILITY

The present disclosure relates to a manufacturing apparatus for manufacturing a battery module. Also, the present disclosure is available for industries related to electronic devices and vehicles equipped with the battery module manufactured by the manufacturing apparatus.

What is claimed is:

1. A manufacturing apparatus, comprising:
a robot arm configured to manufacture a battery module that includes a plurality of cylindrical battery cells and a module housing having an upper case and a lower case configured to accommodate the plurality of cylindrical battery cells,
wherein the robot arm includes:
a first gripper configured to hold or release the plurality of cylindrical battery cells;
a second gripper configured to hold or release the upper case; and
a third gripper configured to hold or release the lower case;
wherein the first gripper includes:
a plurality of first tong units configured to hold or release the plurality of cylindrical battery cells, respectively;
a plurality of first tong driving units respectively connected to ends of the plurality of first tong units and configured to control holding and releasing operation of each of the plurality of first tong units; and
a fixing frame connected to the plurality of first tong driving units.

2. The manufacturing apparatus according to claim 1, wherein the robot arm further includes:
a plate having a plate shape with upper and lower surfaces relatively broader than side surfaces thereof so that the first gripper, the second gripper and the third gripper are mounted thereto;
a driving shaft having a longitudinal terminal portion rotatably connected to the plate to rotate the plate; and
a rotary driving unit configured to move the longitudinal terminal portion of the driving shaft in an upper direction or in a lower direction.

3. The manufacturing apparatus according to claim 2, wherein the fixing frame has a portion coupled to the plate.

4. The manufacturing apparatus according to claim 3, wherein a dented groove dented in an outer direction of one first tong unit not to press a top portion of one cylindrical battery cell is formed at an inner side of the one first tong unit facing the one cylindrical battery cell from among the plurality of first tong units and the plurality of cylindrical batter cells.

5. The manufacturing apparatus according to claim 3, wherein the fixing frame includes:
a movable bar having a body portion with an outer side to which one first tong driving unit among the plurality of first tong units is mounted and a bolt coupled to one side of the body portion;
a fixing member having a guide hole perforated such that a portion of the bolt is inserted therein to guide the movable bar to move in a longitudinal direction of the bolt; and
an elastic member configured to apply a predetermined force to the movable bar in the longitudinal direction of the bolt.

6. The manufacturing apparatus according to claim 5, wherein the fixing frame further includes an erroneous assembling sensor unit configured to detect erroneous assembling while the one first tong unit is inserting one cylindrical battery cell among the plurality of battery cells into a hollow formed at the lower case.

7. The manufacturing apparatus according to claim 6, wherein the erroneous assembling sensor unit includes a laser sensor formed at the fixing member to detect whether the bolt of the movable bar is moved upward.

8. The manufacturing apparatus according to claim 2, wherein the second gripper includes:
a second tong unit having a plurality of pressing plates configured to press both sides of the upper case and a movable shaft configured to move in a direction along which the plurality of pressing plates move closer to each other or farther from each other;
at least one second tong driving unit configured to control a movement of the movable shaft; and
a pressing member connected to the and configured to press the upper case toward the lower case.

9. The manufacturing apparatus according to claim 1, wherein the third gripper includes:
a third tong unit having a plurality of finger units of a bent shape configured to move closer to each other or farther from each other and a pressing bar connected to a terminal portion of one finger unit among the plurality of finger units to press both horizontal sides of the lower case;
at least one third tong driving unit configured to control an operation of the one finger unit; and
a hook connected to the pressing bar and configured to be hooked to a bottom portion of the lower case.

10. A manufacturing method, which manufactures a battery module by using the manufacturing apparatus according to claim 1, the method comprising:
a process in which the first gripper picks and holds the plurality of cylindrical battery cells arranged in one direction;
a process in which the first gripper inserts the plurality of cylindrical battery cells into hollows formed at the lower case and then releases the plurality of cylindrical battery cells;

a process in which the second gripper picks and holds the upper case:

a process in which the second gripper places the upper case at an upper portion of the lower case and presses the upper case onto the lower case;

a process in which the third gripper picks and holds the lower case to which the upper case is mounted; and a process in which the robot arm moves the assembled battery module held by the third gripper to a set location.

11. The manufacturing apparatus according to claim 2, wherein the first gripper is attached to an edge of the plate, and wherein the second gripper and the third gripper are attached to a same surface of the plate.

12. The manufacturing apparatus according to claim 11, wherein the driving shaft is connected to plate at a surface that is opposite the same surface of the plate.

13. The manufacturing apparatus according to claim 2, further comprising an arrangement unit located at the lower surface of the plate, and having a pressing surface configured to press downward on an upper portion of the plurality of cylindrical battery cells accommodated in the lower case.

14. A manufacturing apparatus, comprising:

a robot arm configured to manufacture a battery module that includes a plurality of cylindrical battery cells and a module housing having an upper case and a lower case configured to accommodate the plurality of cylindrical battery cells, wherein the robot arm includes:

a first gripper configured to hold or release the plurality of cylindrical battery cells;

a second gripper configured to hold or release the upper case; and a third gripper configured to hold or release the lower case, wherein the third gripper includes:

a third tong unit having a plurality of finger units of a bent shape configured to move closer to each other or farther from each other and a pressing bar connected to a terminal portion of one finger unit among the plurality of finger units to press both horizontal sides of the lower case;

at least one third tong driving unit configured to control an operation of the finger unit; and a hook connected to the pressing bar and configured to be hooked to a bottom portion of the lower case.

* * * * *